J. V. RAYMOND.

Registering-Thermometer.

No. 6,544. Reissued July 13, 1875.

Witnesses.
Otto Hufeland
Chas Wahlers

Inventor.
John V. Raymond
per
Van Santvoord & Hauff
Attys

N. PETERS, PHOTO-LITHOGRAPHER, WASHINGTON, D. C.

UNITED STATES PATENT OFFICE.

JOHN V. RAYMOND, OF WEST HOBOKEN, NEW JERSEY, ASSIGNOR OF ONE HALF INTEREST TO ADOLPH BAYER.

IMPROVEMENT IN REGISTERING-THERMOMETERS.

Specification forming part of Letters Patent No. 157,633, dated December 8, 1874; reissue No. 6,544, dated July 13, 1875; application filed June 30, 1875.

*To all whom it may concern:*

Be it known that I, JOHN V. RAYMOND, of West Hoboken, in the county of Hudson and State of New Jersey, have invented a new and Improved Self-Registering Thermometer, which invention is fully described in the following specification, reference being had to the accompanying drawing, in which—

Figure 1:
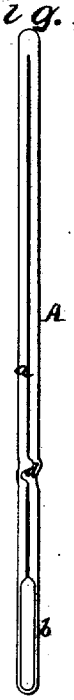
Figure 2:
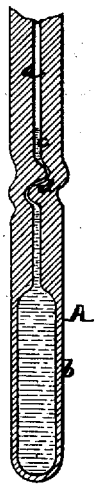
Figure 3:
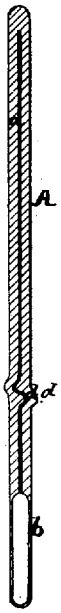
Figure 4:
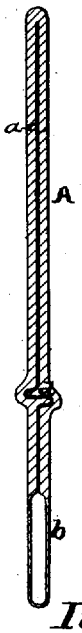

Figure 1 represents a side view. Fig. 2 is a longitudinal vertical section in a larger scale than the previous figure. The remaining figures are modifications.

Similar letters indicate corresponding parts.

This invention relates to an improvement on that class of thermometers in which a small quantity of mercury or other liquid is separated from the main body of said liquid by a little air-bubble, the separation being effected by a contraction in the tube, so that by said separated quantity of mercury or other liquid an index is formed, which rises as the main body of the mercury expands, but which remains stationary in the tube when the main body of the mercury sinks down, and which can only be returned to its starting-point by shaking or swinging the tube in the proper manner. If the shaking or swinging is too violent, the index is liable to displace the separating air-bubble, and to combine with the main body of the mercury, and the thermometer is spoiled.

My invention consists in the arrangement of a twist in the tube of a self-registering thermometer, between the index and the bulb, containing the main body of the mercury or other liquid, in such a manner that, when the thermometer is swung or shaken for the purpose of returning the index to its starting-point, said twist effectually prevents the index from combining with the main body of the mercury, and the thermometer is not liable to get out of order.

In the drawing, the letter A designates a thermometer, which is made of glass, the scale being marked on the outside of the tube *a*. This tube extends from the bulb *b*, which contains the main body of the mercury or other liquid; and in the tube is contained a small quantity of mercury or other liquid, which forms the index *c*, and which is separated from the main body of mercury by a small air-bubble. In the tube *a* I produce a twist, *d*, in any desirable form, the index *c* being contained in that portion of the tube above said twist, which is of such a nature that it prevents said index from falling back upon and mixing with the mercury contained in the lower portion of the tube or in the bulb. When the bulb *b* is exposed to heat—for instance, by placing the same into the hands of a person afflicted with fever—the mercury expands and rises in the tube, passing through the twist *d*, and forcing up the index *c* to a point corresponding to the temperature of the hand of the patient. By taking the thermometer away from the hands of the patient, and allowing it to stand exposed to the temperature of the atmosphere, the mercury sinks down beneath the twist *d*, while the index remains stationary at the point to which it has been raised, and thus the temperature of the hand of the patient can be observed with accuracy. Before a fresh observation can be taken the index must be returned to its starting-point, which is effected by taking hold of the upper end of the tube, and swinging the same rapidly and repeatedly until the index recedes. By the twist *d* the index is prevented from receding beyond the desired point, and the thermometer is not liable to get out of order, whereas in thermometers of the same class, which are made with a plain contraction, the index, when caused to recede by shaking or swinging the tube, is liable to displace the separating air-bubble, and to join the main body of the mercury, whereby the thermometer is rendered inoperative.

What I claim as new, and desire to secure by Letters Patent, is—

A thermometer having a twist, *d*, in its tube *a*, to operate in combination with the index *c*, substantially as shown and described.

In testimony that I claim the foregoing I have hereunto set my hand and seal this 28th day of June, 1875.

JOHN V. RAYMOND. [L. S.]

Witnesses:

W. HAUFF,

E. F. KASTENHUBER.